(12) United States Patent
Sang et al.

(10) Patent No.: US 11,760,295 B2
(45) Date of Patent: Sep. 19, 2023

(54) AIRBAG ASSEMBLY

(71) Applicant: Autoliv Development AB, Vargarda (SE)

(72) Inventors: Ruigang Sang, Shanghai (CN); Mingfei Liang, Shanghai (CN); Mingyao Li, Shanghai (CN)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/754,040

(22) PCT Filed: Jun. 4, 2020

(86) PCT No.: PCT/CN2020/094326
§ 371 (c)(1),
(2) Date: Mar. 22, 2022

(87) PCT Pub. No.: WO2021/057080
PCT Pub. Date: Apr. 1, 2021

(65) Prior Publication Data
US 2022/0332270 A1 Oct. 20, 2022

(30) Foreign Application Priority Data

Sep. 27, 2019 (CN) .......................... 201921626451.0

(51) Int. Cl.
*B60R 21/203* (2006.01)
*B60R 21/215* (2011.01)

(52) U.S. Cl.
CPC ........ *B60R 21/2035* (2013.01); *B60R 21/215* (2013.01)

(58) Field of Classification Search
CPC ................................................ B60R 21/2035
See application file for complete search history.

(56) References Cited

U.S. PATENT DOCUMENTS

| 4,325,568 A * | 4/1982 | Clark | .................. | B60R 21/2035 |
| | | | | 74/484 H |
| 5,354,093 A * | 10/1994 | Schenck | ............... | B60R 21/217 |
| | | | | 280/728.3 |

(Continued)

FOREIGN PATENT DOCUMENTS

| CN | 101500860 A | 8/2009 |
| CN | 104015684 A | 9/2014 |

(Continued)

*Primary Examiner* — Nicole T Verley
(74) *Attorney, Agent, or Firm* — Foley & Lardner LLP

(57) ABSTRACT

A safety airbag assembly, including: an airbag, having an inflated state and a stowed state; an airbag housing; an airbag cover, arranged between the airbag and the airbag housing and at least partially covering the airbag, wherein a hook-shaped member of the airbag cover passes through a bottom wall of the airbag housing from a first side of the airbag housing to a second side of the airbag housing opposite to the first side; and a plurality of locking plates, separated from each other and arranged on a surface of the bottom wall of the airbag housing located on the second side, wherein the locking plates are configured to abut a side surface of the hook-shaped member of the airbag cover so as to prevent the hook-shaped member from moving from the second side to the first side of the airbag housing and from being separated from the airbag housing.

9 Claims, 1 Drawing Sheet

(56) References Cited

U.S. PATENT DOCUMENTS

| | | | |
|---|---|---|---|
| 7,118,125 B2 * | 10/2006 | Lee .................... | B60R 21/2037 |
| | | | 200/61.55 |
| 2004/0195808 A1 | 10/2004 | Amamori | |
| 2005/0067815 A1 | 3/2005 | Dearden et al. | |
| 2006/0055154 A1 * | 3/2006 | Salmon, III ........ | B60R 21/2035 |
| | | | 280/728.2 |
| 2008/0100039 A1 * | 5/2008 | Schramm .......... | B60R 21/21656 |
| | | | 280/728.2 |
| 2008/0100040 A1 * | 5/2008 | DePottey .............. | B60R 21/217 |
| | | | 280/728.2 |

FOREIGN PATENT DOCUMENTS

| | | | | |
|---|---|---|---|---|
| DE | 102011052395 A1 * | 2/2013 | ......... | B60R 21/2037 |
| JP | 6088986 B2 * | 3/2017 | ........... | B60R 21/217 |
| KR | 100641034 B1 * | 11/2006 | | |
| KR | 101637206 B1 * | 5/2008 | | |
| KR | 100852717 B1 | 8/2008 | | |
| KR | 20090065708 A | 6/2009 | | |
| WO | WO-2013017432 A1 * | 2/2013 | ......... | B60R 21/2037 |

\* cited by examiner

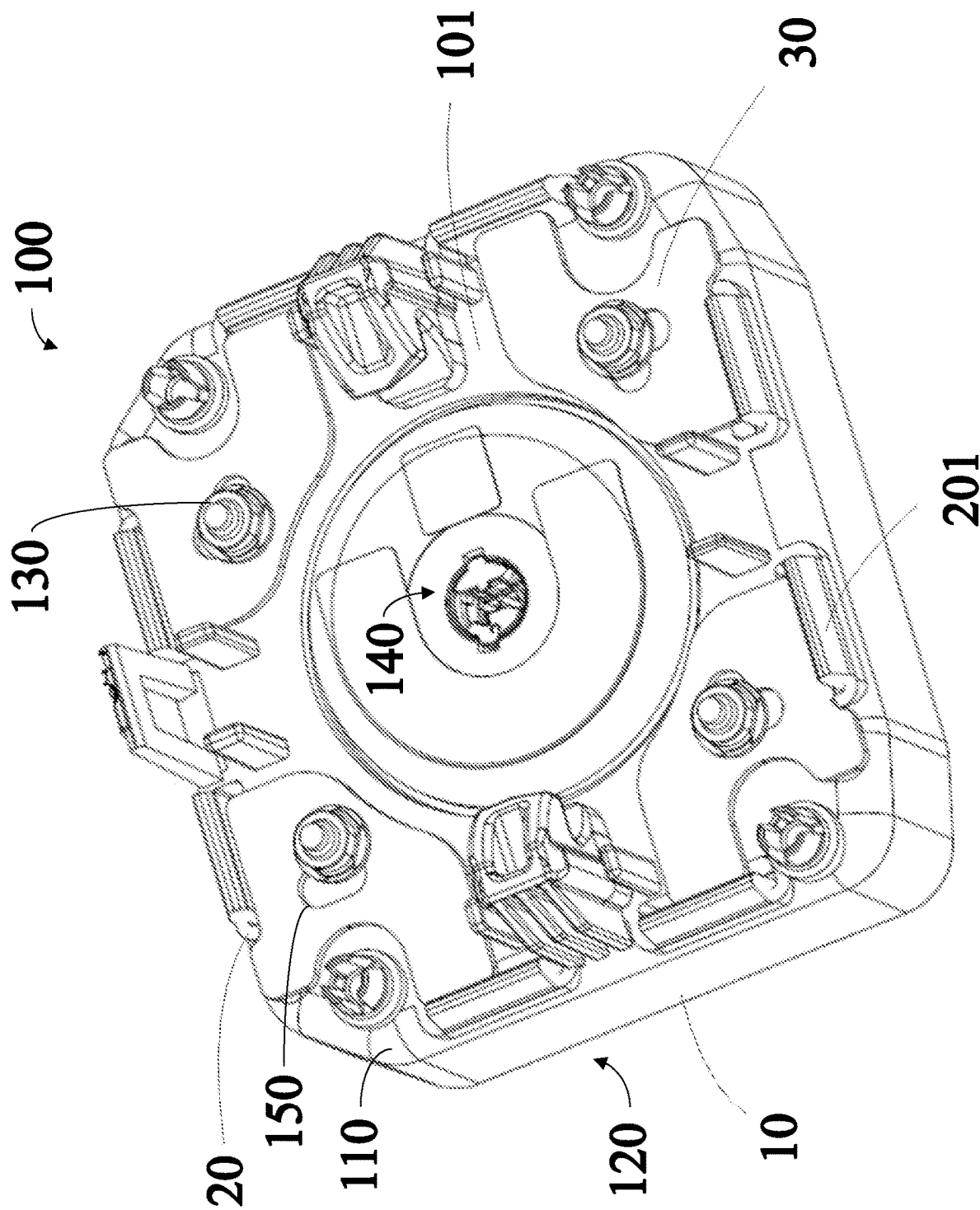

AIRBAG ASSEMBLY

TECHNICAL FIELD

The present invention relates to the field of safety devices of a vehicle, and relates in particular to a safety airbag assembly.

BACKGROUND

A safety airbag assembly includes an airbag housing and an airbag cover that are connected to each other, and an airbag accommodated in a space defined by the airbag housing and the airbag cover. The airbag cover and the airbag housing are connected through a locking plate. Specifically, a portion of the airbag cover passes through the airbag housing from one side of the airbag housing to the other side thereof, and the locking plate locks the airbag cover from the other side so as to prevent the airbag cover from being separated from the airbag housing. However, since locking plates for safety airbag assemblies in the prior art are large, it is difficult to apply the locking plates to safety airbag assemblies having different sizes, resulting in a narrow range of applications, structural interference with adjacent components, weightiness and high manufacturing costs.

Therefore, it is expected to provide a safety airbag assembly that has components with a wide range of applications, is not prone to structural interference, is lightweight, and has low manufacturing costs.

SUMMARY

In order to achieve the above objective, provided in the present invention is a safety airbag assembly, comprising:
  an airbag, having an inflated state and a stowed state;
  an airbag housing, used to accommodate the airbag;
  an airbag cover, arranged between the airbag and the airbag housing and at least partially covering the airbag, wherein a hook-shaped member of the airbag cover passes through a bottom wall of the airbag housing from a first side of the airbag housing to a second side of the airbag housing opposite to the first side; and
  a plurality of locking plates, separated from each other and arranged on a surface of the bottom wall of the airbag housing located on the second side, wherein the locking plates are configured to abut a side surface of the hook-shaped member of the airbag cover so as to prevent the hook-shaped member from moving from the second side to the first side of the airbag housing and from being separated from the airbag housing.

According to an embodiment of the present invention, the number of the locking plates is configured to be four, and the four locking plates are configured to be the same as one another.

According to an embodiment of the present invention, the four locking plates are respectively configured to be sequentially mounted on the bottom wall of the airbag housing in a manner of rotating by the same angle at a first point on the bottom wall.

According to an embodiment of the present invention, the bottom wall is configured to be rectangular, and the first point is configured to be at a symmetrical center of the rectangular bottom wall.

According to an embodiment of the present invention, the number of the hook-shaped members of the airbag cover is configured to be eight, and two outer edges of each of the locking plates are respectively used to abut one of the hook-shaped members.

According to an embodiment of the present invention, the locking plates are connected to the bottom wall of the airbag housing by means of a bolt-nut assembly.

According to an embodiment of the present invention, the safety airbag assembly is configured to be mounted in a steering wheel of a vehicle.

According to an embodiment of the present invention, the locking plates and a gas generator of the safety airbag assembly share the bolt-nut assembly for respective fixation.

According to an embodiment of the present invention, the locking plate is provided with a mounting hole for the bolt-nut assembly, and the locking plate can adjust the position thereof relative to the airbag housing or the airbag cover by means of the mounting hole.

According to an embodiment of the present invention, the number of the locking plates is configured to be four, and the four locking plates are configured to be the same in pairs.

BRIEF DESCRIPTION OF THE DRAWINGS

FIG. 1 is a schematic diagram of a safety airbag assembly according to an embodiment of the present invention.

DETAILED DESCRIPTION

Specific embodiments of a safety airbag assembly according to the present invention will be described below with reference to the accompanying drawings. The following detailed description and the accompanying drawings are used to illustratively explain the principles of the present invention. The present invention is not limited to the described preferred embodiments, and the protection scope of the present invention is defined by the claims.

In addition, terms for spatial relations (such as "upper", "lower", "left", "right", etc.) are used to describe a relative positional relationship between an element and another element shown in the accompanying drawings. Therefore, when used, the terms for spatial relations may be applied to directions different from those shown in the accompanying drawings. Obviously, although all of these terms for spatial relations refer to the directions shown in the accompanying drawings for ease of explanation, a person skilled in the art will appreciate that directions different from those shown in the drawings may be used.

FIG. 1 is a schematic diagram of a safety airbag assembly according to an embodiment of the present invention. The safety airbag assembly according to an embodiment of the present invention is described with reference to FIG. 1. It should be noted that the safety airbag assembly shown in FIG. 1 may be configured to be mounted in a steering wheel of a vehicle.

As shown in FIG. 1, the safety airbag assembly 100 includes an airbag housing 10, an airbag cover 20, locking plates 30 and an airbag (not shown). The above components are described in detail below respectively.

The airbag has an inflated state and a stowed state, and in the situation shown in FIG. 1, the airbag is in the stowed state and is accommodated in a space defined by the airbag housing 10 and the airbag cover 20, and therefore, the airbag is not visible in FIG. 1. The airbag housing 10 is a rectangular housing for accommodating the airbag.

The airbag cover 20 is arranged between the airbag and the airbag housing 10 and at least partially covers the airbag. Furthermore, the airbag cover 20 is configured to have eight hook-shaped members 201, and the eight hook-shaped members 201 are arranged in such a way that each of four sides of the rectangular airbag housing 10 is provided with two hook-shaped members 201. Each of the hook-shaped members 201 passes through a bottom wall 101 of the airbag housing 10 from a first side 110 (that is, an inner side pointing inwardly to the plane of the paper in FIG. 1) of the airbag housing 10 to a second side 120 (that is, an outer side pointing outwardly to outside of the plane of the paper in FIG. 1) of the airbag housing 10 opposite to the first side 110.

In addition, the locking plates 30 of the safety airbag assembly 100 shown in FIG. 1 are configured to be separated from one another and the number of the locking plates is configured to be four, and the four locking plates 30 are configured to be the same as one another. The locking plates 30 are connected to the bottom wall 101 of the airbag housing 10 by means of a bolt-nut assembly 130. Furthermore, all of the four locking plates 30 are arranged on a surface of the bottom wall 101 of the airbag housing 10 located on the second side 120, which may be understood as the four locking plates 30 being located on an outer surface of the bottom wall 101 of the airbag housing 10 on the outer side. As shown in FIG. 1, each of the four locking plates 30 is configured to abut a side surface of the hook-shaped member 201 of the airbag cover 20 so as to prevent the hook-shaped member 201 from moving from the second side 120 to the first side 110 of the airbag housing 10 and from being separated from the airbag housing 10, thereby preventing the airbag cover 20 from being separated from the airbag housing 10. Those skilled in the art could understand that when the hook-shaped members 201 move from the second side 120 to the first side 110 of the airbag housing 10, the locking plates 30 will be hooked at hook parts of the hook-shaped members 201 so as to prevent the hook-shaped members 201 from moving further, thereby preventing the hook-shaped members 201 from moving from the second side 120 to the first side 110 of the airbag housing 10 and from being separated from the airbag housing 10, and preventing the airbag cover 20 from being separated from the airbag housing 10. In addition, two outer edges of each locking plate 30 are respectively used to abut one of the hook-shaped members 201. For example, for the locking plate 30 located at the bottom left corner of the bottom wall 101 in FIG. 1, the outer edge on the left side and the outer edge on the lower side are respectively used to abut one of the hook-shaped members 201.

Further, in the safety airbag assembly 100 according to an embodiment of the present invention shown in FIG. 1, four locking plates 30 are respectively configured to be sequentially mounted on the bottom wall 101 of the airbag housing 10 in a manner of rotating by the same angle at a first point 140 at a symmetrical center on the bottom wall 101. According to an embodiment of the present invention shown in FIG. 1, the locking plate 30 is provided with a mounting hole 150 for the bolt-nut assembly, and the locking plate 30 can adjust the position thereof relative to the airbag housing 10 or the airbag cover 20 by means of the mounting hole 150.

The safety airbag assembly of the present invention uses the plurality of locking plates separated from one another to lock the airbag cover on the airbag housing, and therefore, the locking plate itself has a small volume and is lightweight, so that a processing tool of the locking plate has a small volume and low manufacturing costs, and the locking plate is not prone to structural interference with adjacent components. In addition, different numbers of locking plates can be selected for different working conditions, thereby achieving a wide range of applications. Therefore, the safety airbag assembly of the present invention has components with a wide range of applications, is not prone to structural interference, is lightweight, and has low manufacturing costs.

Those skilled in the art could understand that the above safety airbag assembly according to an embodiment of the present invention described with reference to FIG. 1 is only illustrative, and the safety airbag assembly of the present invention is not limited to the above example. For example, in the safety airbag assembly of the present invention, the number of the locking plates is not limited to be configured to be four, and the plurality of locking plates are not limited to be configured to be the same. Those skilled in the art could configure the number of the locking plates to be different from the above number (such as two) according to actual working conditions, and the plurality of locking plates may be configured in such a way that some of the locking plates are configured to be the same as one another, or even all locking plates may be configured to be different from one another. The bottom wall is not limited to be configured to be rectangular, and may be configured to be of another shape (such as a circle) according to actual working conditions. The four locking plates are not limited to be respectively configured to be sequentially mounted on the bottom wall of the airbag housing in a manner of rotating by the same angle at the first point on the bottom wall, the first point is not limited to be configured to be a symmetrical center of the rectangular bottom wall, and those skilled in the art could determine the mounting manner of the plurality of locking plates and the mounting angles and relative positions with respect to the locking plates according to actual working conditions. The number of the hook-shaped members of the airbag cover is not limited to be configured to be eight, the two outer edges of each locking plate are not limited to be respectively used to abut one of the hook-shaped members, and those skilled in the art could configure the number of the hook-shaped members of the airbag cover and the relative position between the locking plates and the hook-shaped members according to actual working conditions. The locking plates are not limited to be connected to the bottom wall of the airbag housing by means of the bolt-nut assembly, and those skilled in the art could select other connection manners according to actual working conditions. In addition, the safety airbag assembly of the present invention is not limited to be configured to be mounted in the steering wheel of the vehicle, and could be mounted in other components of the vehicle.

As described above, although the exemplary embodiments of the present invention have been described with reference to the accompanying drawings in the description, the present invention is not limited to the aforementioned specific embodiments, and the protection scope of the present invention should be defined by the claims and equivalent meanings thereof.

The invention claimed is:

1. A safety airbag assembly, comprising:
   an airbag housing, configured to accommodate an airbag;
   an airbag cover, configured to be arranged between the airbag and the airbag housing and at least partially cover the airbag, wherein a hook-shaped member of the airbag cover passes through a bottom wall of the airbag housing from a first side of the airbag housing to a second side of the airbag housing opposite to the first side; and
   a plurality of locking plates, separated from each other and arranged on a surface of the bottom wall of the airbag housing located on the second side, wherein the locking plates are configured to abut a side surface of the hook-shaped member of the airbag cover so as to prevent the hook-shaped member from moving from the second side to the first side of the airbag housing and from being separated from the airbag housing.

2. The safety airbag assembly according to claim 1, wherein the number of the locking plates is configured to be four, and the four locking plates are configured to be the same as one another.

3. The safety airbag assembly according to claim 2, wherein the four locking plates are respectively configured to be sequentially mounted on the bottom wall of the airbag housing in a manner of rotating at a first point on the bottom wall.

4. The safety airbag assembly according to claim 3, wherein the bottom wall is configured to be rectangular, and the first point is configured to be at a symmetrical center of the rectangular bottom wall.

5. The safety airbag assembly according to claim 4, wherein the number of the hook-shaped members of the airbag cover is configured to be eight, and two outer edges of each of the locking plates are respectively used to abut one of the hook-shaped members.

6. The safety airbag assembly according to claim 5, wherein the locking plates are connected to the bottom wall of the airbag housing by means of a bolt-nut assembly.

7. The safety airbag assembly according to claim 6, wherein the safety airbag assembly is configured to be mounted in a steering wheel of a vehicle.

8. The safety airbag assembly according to claim 7, wherein the locking plate is provided with a mounting hole for the bolt-nut assembly, and the locking plate can adjust the position thereof relative to the airbag housing or the airbag cover by means of the mounting hole.

9. The safety airbag assembly according to claim 1, wherein the number of the locking plates is configured to be four, and the four locking plates are configured to be the same in pairs.

* * * * *